May 7, 1963  W. C. CONOVER  3,088,783
BEARING AND METHOD OF CONSTRUCTION THEREOF
Filed March 12, 1954

INVENTOR.
WARREN C. CONOVER
BY
Wheeler, Wheeler + Wheeler
ATTORNEYS

United States Patent Office 3,088,783
Patented May 7, 1963

3,088,783
BEARING AND METHOD OF CONSTRUCTION THEREOF
Warren C. Conover, Waukegan, Ill., assignor to Outboard Marine Corporation, a corporation of Delaware
Filed Mar. 12, 1954, Ser. No. 415,889
7 Claims. (Cl. 308—35)

This invention relates to a bearing and method of construction thereof.

A crank shaft and connecting rod bearing has been chosen to exemplify the invention. In a bearing of the indicated type, roller anti-friction elements are used between the crank and the connecting rod and the end faces of the connecting rod have a relatively close bearing fit between the cheeks or crank faces of the shaft, for the purpose of positioning the connecting rod on the crankshaft.

The bearing surfaces of the crankshaft, as well as the connecting rod, are hardened. The rolling friction of the roller rollers is quite low and the roller rollers carry the normal connecting rod bearing load satisfactorily. However, in the event that a needle bearing or roller tends to skew, as sometimes happens, whether or not the rollers are provided with a retainer, it causes axial bearing pressure which is beyond the capacity of the thrust faces to carry, particularly at high speeds. The end faces of the connecting rod and the crank faces of the shaft, both being of hard steel can, due to the high rubbing speed, generate a high degree of heat particularly because hardened steel on hardened steel is not a good bearing combination. It has been found that the heat generated can be high enough to completely destroy the lubricating oil film in the bearing and consequently destroy the complete bearing.

According to the present invention, some metal which provides a non-galling surface in conjunction with steel is plated on one of the two members which have rubbing face contact. As between the cheek faces of the crankshaft and end faces of the connecting rod on the other, it is preferred that the plating be done on the connecting rod, solely for convenience of manipulation.

It is broadly immaterial how much of the connecting rod is plated, or which of the various metals suitable for non-galling bearing contact with steel is used, as long as the surfaces contacted by the rollers are not plated. In practice it has been found appropriate to plate the end faces of the connecting rod with silver, which happens to be a metal that plates readily and provides a good bearing material for coaction with steel.

Figures 1, 2:
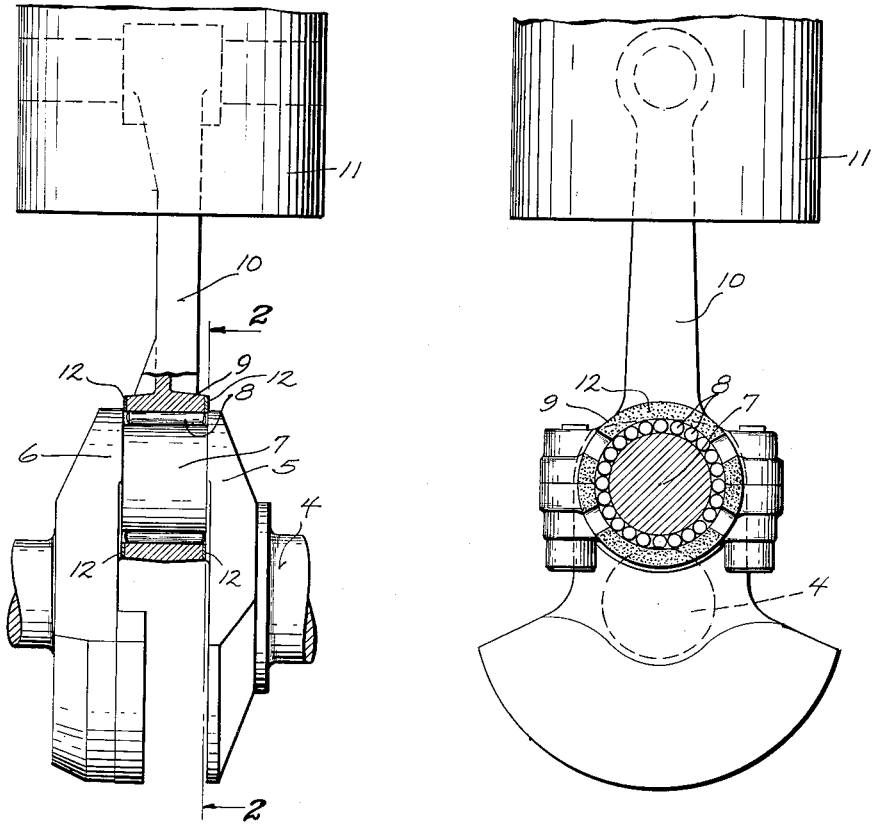
FIG. 1 is a view of a bearing embodying the invention as it appears partially in side elevation and partially in axial section.
FIG. 2 is a view taken on line 2—2 of FIG. 1.

The crank shaft 4 has counterbalancing crank cheeks 5, 6 between which extends the crank 7. The crank is encircled by an annular series of roller bearing elements 8 confined within the two-part annular bearing 9 of a connecting rod 10 for piston 11. It will be understood that this specific bearing structure is one in which the invention has been found to have great utility. However, it is merely illustrative of the broader aspects of the invention, which is suitable for use in other bearings.

According to the invention, the end faces of the connecting rod bearing 9 have surface deposits 12 of some non-galling metal, silver being preferred. These are shown in section in FIG. 1, the thickness being necessarily exaggerated. They are shown by stippling in FIG. 2. The thickness may be varied as desired. An extremely thin plating, barely sufficient to cover the surface of the steel serves the essential objectives of the invention. In practice the deposit of plated bearing metal has been .002" in thickness on each of the end faces of the rod bearing. Lead and tin are examples of non-galling metals usable instead of silver.

Figure 3:
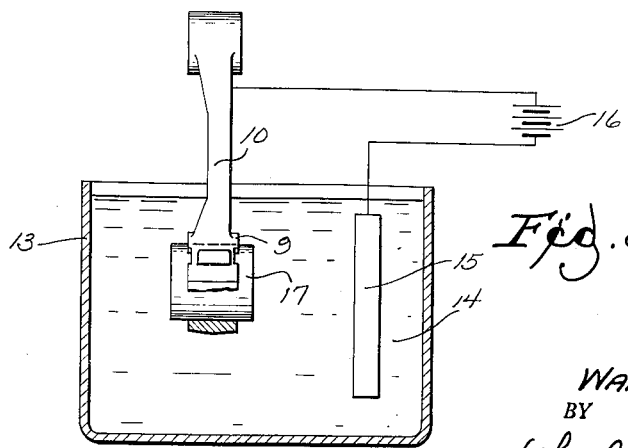
FIG. 3 is a view diagrammatically illustrating a plating operation.

FIG. 3 diagrammatically illustrates the plating step. A container 13 filled with electrolyte at 14 has within it an electrode 15. The battery 16 is connected between electrode 15, and the connecting rod 10 and the bearing end of the connecting rod is lowered into the electrolyte and allowed to remain there for a sufficient period to effect the required deposit of silver or other non-galling metal.

Except for purposes of economy, there is no reason to limit the extent to which the connecting rod is exposed to the electrolyte to receive silver deposits. In practice, the interior of bearing race 9 is shut off from the electrolyte by introduction therein of an elastic plug 17 of natural or synthetic rubber. External surfaces of the rod on which plating is not desired may be protected by any of the well-known compounds for excluding contact with the electrolyte.

Regardless of how much of the connecting rod may be plated, the purpose of the present invention is served by the plating which covers the end faces of its bearing race so that the plated metal, rather than the steel of the connecting rod, is in bearing contact with the crank checks 5 and 6 during acual operation.

The plating of either one of the two surfaces in contact at each end of the bearing (either the crank cheek or the complementary surface of the connecting rod), eliminates the heating and enables the oil film to remain effective and allows the rollers to function under high load without damage, with the result that bearing destruction heretofore noted is substantially completely eliminated.

I claim:

1. A method of constructing a roller bearing of the type employing an annular series of roller bearing elements between concentric cylindrical bearing surfaces on members which have end faces in bearing contact, such method being adapted to prevent roller skewing and including the plating of one of such end faces with a metal having non-galling characteristics when it bears upon the other of said faces.

2. The method of claim 1 in which the bearing comprises a connecting rod bearing and the faces referred to are respectively disposed on a crank shaft and a connecting rod.

3. The method of claim 1 in which the plating is done with silver, the face with which it is in contact being steel.

4. A method of protecting from failure the rollers of a roller bearing between a connecting rod and a crank shaft, the crank shaft having steel cheeks and the connecting rod bearing having steel bearing faces disposed between the cheeks, said method comprising facing the said bearing faces with a non-galling metal and assembling the connecting rod bearing upon the crank shaft with intervening rollers, and engaging the faced ends of the connecting rod bearing with the steel cheeks of the crank shaft.

5. A bearing comprising an inner member having a generally cylindrical bearing surface and spaced planiform faces at right angles thereto, rolling bearing elements surrounding the cylindrical bearing surface between said faces, and an outer bearing member having a cylindrical surface confining the roller bearing elements and having planiform faces complementary to the faces first mentioned, and in bearing engagement therewith, the faces of one of said members having a superficial layer of a bearing metal differing from the rest of the metal of the member and having non-galling characteristics with reference to the bearing face of the other member.

6. A connecting rod and crank shaft bearing comprising the combination with a steel crank shaft having a crank with a bearing surface and spaced cheeks at the ends of such surface, and a steel connecting rod having an inner bearing surface radially spaced from the bearing surface of the crank, needle anti-friction rollers packed side by side between the bearing surface of the crank and the inner bearing surface of the connecting rod, said needle rollers being freely rotatable on their respective axes and having their ends exposed to the crank shaft cheeks, the connecting rod having silver plated end faces confined between the cheek bearing faces of the crank shaft and in bearing contact therewith.

7. An anti-friction bearing comprising two coaxial annular members, an annular series of anti-friction bearing elements between said members, said elements being adapted to roll between said members upon relative rotary movement of said members, one of said members having a radial surface in rotary axial bearing relation with a complementary radial surface of the other of said members, and a non-galling metal facing on one of said surfaces operative to prevent heating of said elements between said members.

References Cited in the file of this patent

UNITED STATES PATENTS

| | | |
|---|---|---|
| 1,355,706 | Snyder | Oct. 12, 1920 |
| 1,649,258 | Rummins | Nov. 15, 1927 |
| 1,717,204 | Gotz | June 11, 1929 |
| 2,124,060 | Gilman | July 19, 1938 |
| 2,187,755 | Ryder | Jan. 23, 1940 |
| 2,266,276 | Schluchter et al. | Dec. 16, 1941 |
| 2,354,763 | Machlett | Aug. 1, 1944 |
| 2,403,645 | Etchells | July 9, 1946 |
| 2,624,645 | Virtue | Jan. 6, 1953 |

FOREIGN PATENTS

| | | |
|---|---|---|
| 623 | Australia | Feb. 18, 1926 |

OTHER REFERENCES

Silver-Surfacing, pages 61–63 and 100 of the Steel Magazine, July 25, 1949.